United States Patent Office 3,230,059
Patented Jan. 18, 1966

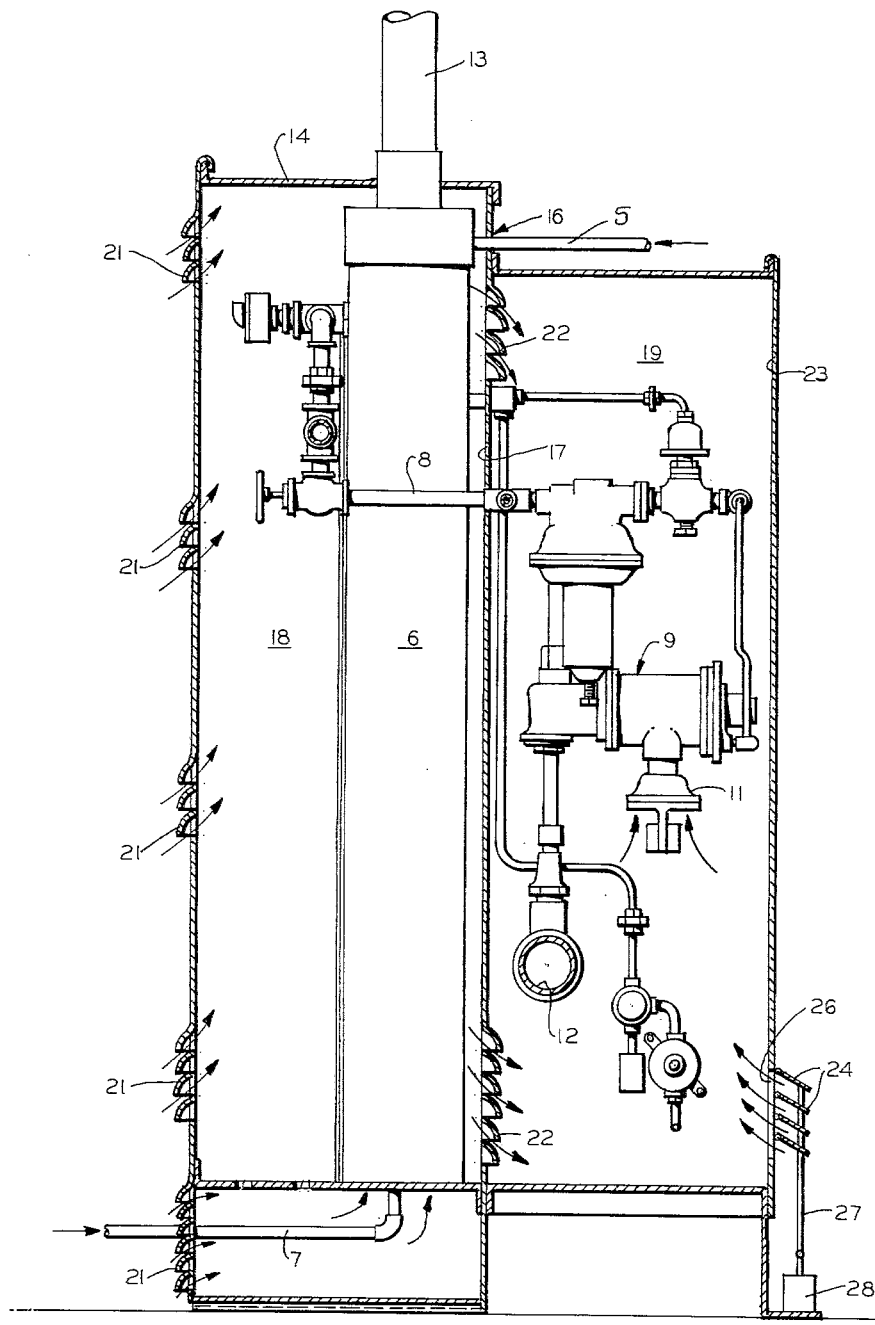

3,230,059
CABINET FOR THE CONSERVATION, UTILIZATION AND CONTROL OF OTHERWISE WASTE HEAT FROM A THERMAL VAPORIZER AND MIXER
Allen J. Kinley, 4502 Pleasant Valley Court, Oakland, Calif.
Filed Nov. 15, 1961, Ser. No. 152,548
4 Claims. (Cl. 48—180)

My invention relates to mechanisms especially useful in preparing air and normal liquid-gas such as butane and propane for subsequent distribution and combustion. These devices almost always include an exothermic vaporizer unit which furnishes sufficient heat to vaporize the main body of liquid-gas so that it can be mixed with the main air, either by burning a small fraction of the liquid-gas with some air to furnish sufficient heat to vaporize the main body of liquid-gas or by means of indirect heating of the main body of liquid-gas by steam or hot water so it can be mixed with the main body of air. Often the vaporizer units are installed in exterior locations and are subjected to the vagaries of the weather. Satisfactory vaporization and mixing of the liquid-gas with air depends largely on the maintenance of an appropriate temperature of the vaporized liquid-gas and the main air comprising the total mixed gas. The energy of the liquid-gas under pressure is used to aspirate the main air which is warmed to prevent reliquefaction of the expanding liquid-gas. The prior arrangements are not well-suited to economical, effective use.

It is therefore an object of the invention to provide a cabinet to protect a thermal vaporizer and vaporized liquid-gas and air mixer from the vagaries of the weather and to assist in the maintenance of an appropriate operating temperature.

Another object of the invention is to provide a cabinet for a thermal vaporizer such that heat from the vaporizer which normally would be lost is retained in an appropriate amount for heating of the main air for the mixer.

Another object is to improve the operation of thermal vaporizers and mixers.

Another object is to improve the calorific value of the mixed, vaporized liquid-gas and air.

Other objects of the invention are attained in the embodiment of the invention described in the accompanying description and illustrated in the accompanying drawing in which:

The figure is a cross section on a transverse vertical plane showing the cabinet and also showing therein a thermal vaporizer largely in side elevation and in typical or diagrammatic form and also showing a vaporized liquid-gas and air mixer in side elevation and in typical or diagrammatic form.

Although it is by no means confined thereto, the cabinet of the invention is especially designed in the embodiment shown herein for use in connection with a thermal vaporizer for liquid-gas and in connection with an air mixer. The vaporizer and the mixer are well-known commercial sorts. The cabinet has two portions, a heater or vaporizer portion and a mixer portion. In the first vaporizer portion, liquid-gas such as propane or butane is furnished through an inlet pipe 5 to a vaporizer 6. A small amount of liquid-gas is also furnished through a supply pipe 7 and is burned with an appropriate amount of air in the vaporizer 6 to afford sufficient heat to vaporize a much larger amount of liquid-gas.

The resulting large volume of vapor is then conducted through a conduit 8 to a mixer 9. This mixer includes a number of valves and fittings and a mixing aspirator all for the purpose of mixing fuel vapor from the vaporizer 6 with a proper amount of air. The mixer 9 has an air inlet 11 which admits atmospheric air to mix with the vapor received through the conduit 8 and then furnishes the admixture in fixed proportion for discharge from the cabinet through an appropriate discharge header 12 for subsequent use.

The operation of the vaporizer is substantially automatic once it has been initiated, the mechanism taking in continuously a supply of liquid-gas through the pipes 5 and 7 and furnishing a supply of vapor through the conduit 8 to the gas and air mixer 9. The operation of the mixer is substantially automatic, taking a supply of vaporized gas from the conduit 8 and air from the inlet 11 and discharging the gas-air mixture through the header 12. Air from the atmosphere is taken for mixture with the vapor through the inlet 11 while the products of combustion from the heater or vaporizer 6 are discharged through a vent pipe 13 passing through the tightly engaging upper wall 14 of the cabinet 16 provided pursuant to the invention.

The cabinet itself is conveniently fabricated of any suitable material, preferably sheet metal, on appropriate framing, if required, and affords an adequately roomy enclosure against the elements for all of the described parts. The cabinet is provided with a central intermediate partition wall 17 dividing the interior of the cabinet into a first compartment 18 or section generally surrounding the vaporizer 6 and a second compartment 19 or section generally surrounding the mixer 9.

The first compartment 18 is substantially closed to the atmosphere except for a number of inlet louvers 21 provided at appropriate locations to admit atmospheric air. This air surrounds and flows around the vaporizer 6 and can discharge from the first section 18 only through similar louvers 22 afforded in appropriate parts of the intermediate partition wall 17. Air in the first compartment 18 can discharge only into the second compartment 19. During the traverse of air through the compartment 18 the temperature of the air is increased substantially by reason of heat dissipated by the vaporizer 6. This heat would normally be radiated and lost, but in the present instance is generally conserved and restricted to heating the air which flows through the first compartment 18.

The warmed atmospheric air flowing through the louvers 22 into the second compartment 19 has no escape therefrom except as it may be inspirated by the air inlet 11. The quantity of air which flows into the mixer 9 through the inlet 11 is entirely dependent upon the rate of withdrawal of vapor-air mixture through the header 12 and varies as the mechanism repsonds to variations in load (demand).

Since there is no air exit from the cabinet 16 except through the mixer air inlet 11, the amount of atmospheric air which flows through the device is entirely dependent upon the rate of operation of the mixer itself. Since the automatic controls (not shown in detail) vary the rate of operation of the vaporizer portion 6 in accordance with load, the cabinet enclosure with its louvers ensures that an amount of air proper for the instantaneous load upon the vaporizer and mixer will be pulled around the vaporizer portion, will have its temperature properly raised and will then be inspirated through the air inlet 11 for mixture with vapor and discharged through the header 12. In this way an appropriate or proportioned supply of the requisite amount of heated air is afforded for the mixing portion 9 so that the resulting mixture is at the proper temperature. Reversion of the vapor to liquid does not occur.

Under some circumstances and in some localities there are times when it is inadvisable to preheat the air entering the air inlet 11. For that reason the front wall 23 of the cabinet 16 is provided with appropriate shutters 24 guarding an air opening 26 leading directly from the atmosphere to the second compartment 19. The shutters 24 are all connected to a rod 27 actuated by a thermostat 28. Under normally cold or usual atmospheric conditions the thermostat 28 maintains the shutters 24 closed so that the air going into the inlet 11 maintains a slightly subatmospheric pressure within the second compartment 19 and so pulls atmospheric air through the various louvers 21 and 22 for admixture.

When the thermostat 28 responds to a high enough outside temperature, the shutters 24 are opened and atmospheric air can enter directly through the opening 26 to the second compartment 19. This atmospheric air not only flows directly and without being substantially heated into the inlet 11 but supplies the inlet 11 with sufficient air so that the pressure within the first compartment 18 remains substantially atmospheric and there is virtually no air flow therethrough. Consequently, the thermostat 28 has the function of controlling the direct access of atmospheric air without heating to the inlet 11 and also of substantially obviating the supply of heated air from the vaporizer 6 to the air inlet 11. The thermostat can assume various intermediate positions according to temperature and so control the amount of inlet air heating.

With the use of this structure, not only are the vaporizer and mixer units neatly and attractively housed and protected but also heat which normally would go to waste is effectively utilized in a predetermined or effective amount to admix with the vapor generated in order to afford a suitable vapor air mixture for discharge. Under extreme conditions when this normally desirable heating might be deleterious there is provided a means for short-circuiting or shunting the air heating arrangement and for supplying atmospheric air directly to the mixing structure.

What is claimed is:

1. A device for handling liquid-gas comprising an enclosing cabinet, a wall separating said cabinet into a first compartment and a second compartment, means for admitting atmospheric air into said compartment, a liquid-gas themal vaporizer mounted in said first compartment and when in operation supplying liquid-gas vapor and releasing heat into said first compartment to warm said air therein; means in said wall for admitting air from said first compartment to said second compartment, an aspirating mixer for liquid-gas vapor and air mounted in said second compartment and including an air inlet and a discharge header, means for conducting liquid-gas vapor from said thermal vaporizer to said mixer, said mixer when operating aspirating air from said second compartment into said mixer air inlet for flow out said discharge header, said mixer inlet being the sole air discharged from said second compartment whereby the flow of liquid-gas vapor through said mixer induces the flow of atmospheric air through said first compartment wherein said air is warmed by the concurrent exothermic action of said vaporizer and then said warm air is induced to flow into said second compartment and is removed from said second compartment by flow through said air inlet of said mixer and through said discharge header.

2. A device comprising an enclosing cabinet, an interior wall dividing said cabinet into a first compartment and a second compartment, an exothermic vaporizer in said first compartment and effective when in operation to provide vapor and to release heat to the surrounding air, means in said cabinet defining a first opening between the atmosphere and said first compartment, means in said wall defining a second opening between said first compartment and said second compartment, an aspirating vapor-air mixer in said second compartment, means for conducting vapor from said vaporizer to said mixer, means forming an air inlet to said vapor-air mixer for admitting air thereto for mixture with vapor therein and constituting the sole air outlet from said second compartment, and a discharge header leading from said vapor-air mixer out of said cabinet, said vapor-air mixer being effective when operating to aspirate atmospheric air through said first opening and around said vaporizer and through said second opening into said inlet and then out of said cabinet as part of a mixture of vapor and air formed in said vapor-air mixer and flowing through said discharge header.

3. A device as in claim 2 including a conduit for supplying liquid-gas to said vaporizer.

4. A device as in claim 2 including means in said cabinet defining a third opening between the atmosphere and said second compartment, and means responsive to atmospheric temperature for controlling atmospheric air flow through said third opening.

References Cited by the Examiner

UNITED STATES PATENTS

| | | | |
|---|---|---|---|
| 389,906 | 9/1888 | Rounds | 312—213 |
| 1,067,582 | 7/1919 | Boyd et al. | 48—107 |
| 1,736,201 | 11/1929 | Kuenhold. | |
| 1,754,518 | 4/1930 | Kinnie. | |
| 1,767,157 | 6/1930 | Steele. | |
| 2,214,375 | 9/1940 | Jackson | 137—457 X |
| 2,366,322 | 1/1945 | Foster | 48—180 |
| 2,637,637 | 5/1953 | French | 48—107 |
| 2,661,271 | 12/1953 | Hyatt et al. | 48—212 |
| 2,738,261 | 3/1956 | Drake. | |

MORRIS O. WOLK, *Primary Examiner.*

GEORGE D. MITCHELL, *Examiner.*